C. G. Bloomer,
Making Lockets,
No. 851. Reissued Nov. 15, 1859.
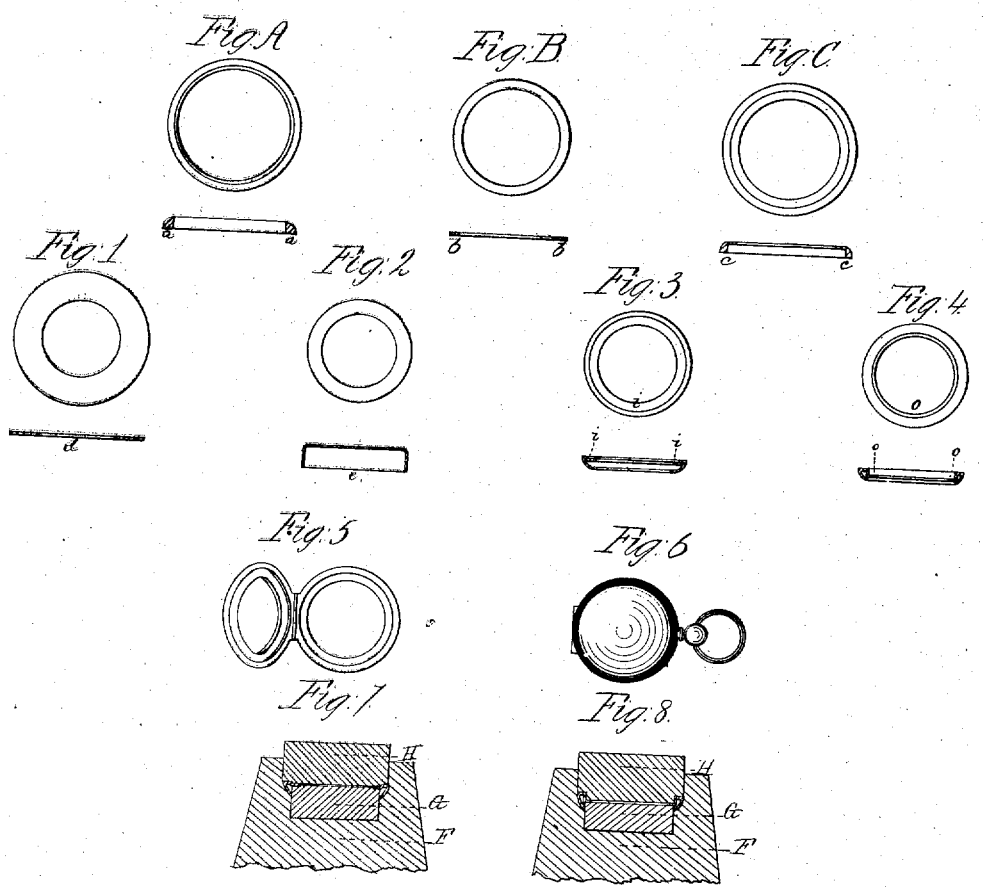
Witnesses:
James Edwards
William H. Congdon
Inventor:
Charles G. Bloomer

UNITED STATES PATENT OFFICE.

CHARLES G. BLOOMER, OF WICKFORD, RHODE ISLAND.

MODE OF CONSTRUCTING LOCKETS.

Specification forming part of Letters Patent No. 17,137, dated April 28, 1857; Reissue No. 851, dated November 15, 1859.

*To all whom it may concern:*

Be it known that I, CHARLES G. BLOOMER, of Wickford, in the county of Washington and State of Rhode Island, have invented a new and useful Improvement in the Method of Manufacturing Lockets and Similar Metallic Cases; and I do hereby declare that the following is a full, clear, and exact description of the same, reference being had to the accompanying drawings, and to the letters of reference marked thereon.

Lockets are formed of two halves or sides, alike in general form, connected by a hinge, held shut by a spring-catch, and suspended by a metallic ring passed through a stud or knob, so as to resemble in material, form, and finish an ordinary watch-case. Each side of the locket consists, generally, of two parts—a ring-base, commonly called the "rim," and the plate that forms the outer case or "back." The latter is frequently replaced on one side of the locket by a glass similar to a watch-glass.

Prior to my invention the rim of each side of the locket was generally formed of two pieces of the form represented at Figures A, B, and C. One of these pieces consisted of a solid ring, Fig. A, formed of wire of the section required, as shown at *a a*, bent into a ring form and soldered where the ends met. The other piece, Fig. B, which is commonly called the "field-piece," was formed of flat wire, as shown in section at *b b*, also bent into a ring form and soldered where the ends met. The two pieces were then soldered together, as represented at Fig. C. Locket-rims constructed in this manner are objectionable on account of the cost of manufacture and the weight of metal required; hence I devised a sheet-metal rim for lockets and similar metallic cases, in which the ring and field-piece are of one piece of metal. This new rim constitutes the subject of Letters Patent bearing even date herewith; and the object of the invention which is the subject of this specification is a cheap and efficient means of giving the finished shape to such rims. Locket-rims are generally required to have two forms alike externally, but differing in the form of the field-piece. These two forms are represented at Figs. 3 and 4 in the annexed drawings. Both of these forms are made from pieces of sheet metal of the form represented at Fig. 2, which may be made in any desirable manner from a flat, thin piece or sheet of metal.

In order to form the rim, Fig. 3, a set of dies are provided and are fitted into a suitable die-press. The form of the acting faces of these dies are those of the exterior surfaces of the finished rim, the face of the upper die being such that in acting upon the gathered-in part of the piece Fig. 2 it gives it the shape of the flat field-piece *i* of Fig. 3, while the face of the lower die is such that it gathers in the cylindrical part of the piece Fig. 2, and gives it the shape of the exterior ring of Fig. 3.

I prefer to construct the dies in three parts, as represented in section at Fig. 7. One of these parts consists of a matrix of steel, F, with a cavity formed therein to receive a plug, G, and to give form to the exterior of the rim. The upper face of this plug, which constitutes the second part of the dies, limits the distance to which the field-piece of the rim can be depressed; and the plug is of such length that when it is in place the bottom of the cavity, unfilled, in the matrix is the counterpart of the exterior of the rim. The third part of the dies consists of a plug of steel or follower, H, whose lower face is the counterpart of the face of the field-piece. This plug is of such size that it can enter freely into the cavity of the matrix to compress the rim therein.

In using these dies the sheet metal, previously formed into the ring Fig. 2, is placed in the matrix with its cylindrical part downward. The follower H is then depressed upon it by the assistance of a suitable press, and the ring of metal, under the action of the dies, assumes the required form.

In order to form the rim Fig. 4, a second set of dies are required, whose faces are those of the exterior surface of this finished rim, the face of the upper die being such that in acting upon the flat field-piece *i* of Fig. 3 it gives it the shape of the depressed field-piece *o* of Fig. 4, while the lower die simply supports the piece of metal without changing its form. In finishing this rim I prefer to use the same matrix, F, Fig. 8, as is used for forming the preceding one. In this case the plug first used is removed and replaced by another, G′, whose upper face is suited to the greater distance to which the field-piece is to be depressed, and the follower first used is replaced by another, H′, whose face is the counterpart of the depressed field-piece.

In using these dies a locket-rim, to which form has been imparted by the first set of dies, is inserted in the matrix and the follower is depressed upon it, as at the preceding operation, and the metal, under the action of the dies, assumes the required form.

Although my invention does not extend to the method of manufacturing the piece represented at Fig. 2, I deem it proper to state that the most convenient method of producing it with which I am acquainted is to act upon a circular planchet—such as is represented at Fig. 1—by means of a pair of dies of suitable form.

I am aware that it has been customary long prior to the date of my invention to use dies of various forms for acting upon and giving shape to thin or sheet metal, and therefore do not claim to be the first who used dies for such purposes; but I believe that I am the first person who discovered that pieces of thin or sheet metal could be bent and pressed by the operation of dies into the form of a rim for lockets and similar metallic cases—such, for example, as those represented at Figs. 3 and 4.

What I claim, therefore, as my invention, and desire to secure by Letters Patent, is—

The method of imparting the finished shape to case-rims of sheet or thin metal in which the external ring and field-piece are one piece of metal by means of dies, substantially as herein set forth In testimony whereof I have hereunto subscribed my name.

CHARLES G. BLOOMER.

Witnesses:

WILLIAM H. CONGDON,
JAMES EDWARDS.